A. D. CATLIN.
MACHINE FOR MAKING CHOCK BLOCKS.
APPLICATION FILED JUNE 4, 1913. RENEWED OCT. 17, 1914.
1,133,931.
Patented Mar. 30, 1915.
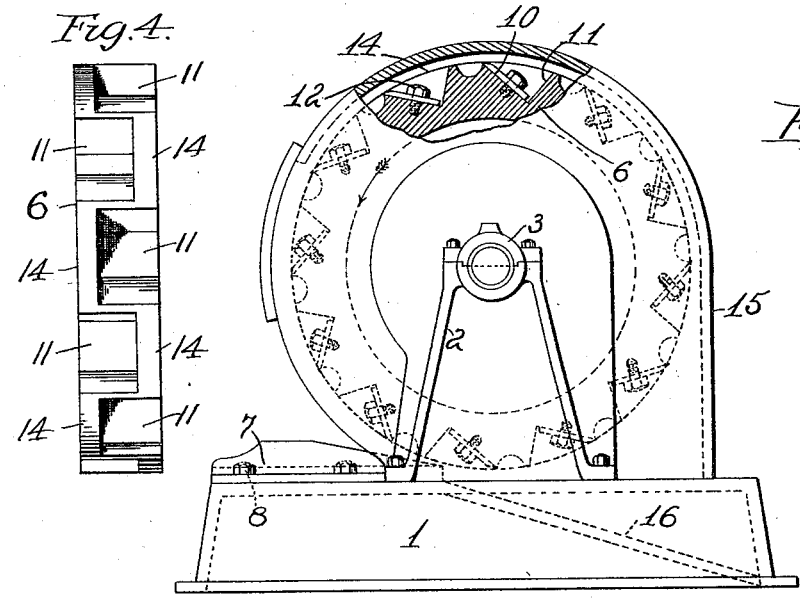
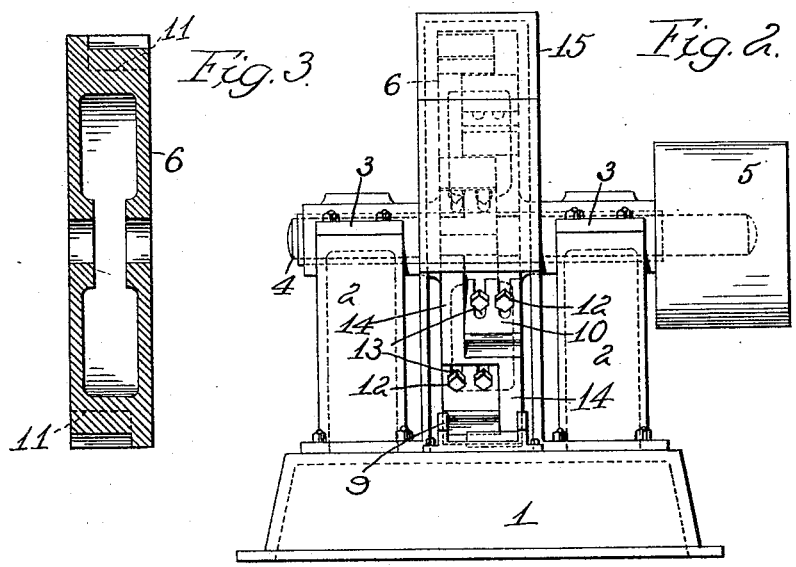
Attest.
Benton M. Stahl
Chas. F. Calhoun, Jr.
Inventor.
Abel D. Catlin.
By Spear, Middleton, Donaldson & Spear
Attys.
THE NORRIS PETERS CO., PHOTO-LITHO., WASHINGTON, D. C.

UNITED STATES PATENT OFFICE.

ABEL D. CATLIN, OF CHATTANOOGA, TENNESSEE, ASSIGNOR TO J. M. CARD LUMBER CO., OF CHATTANOOGA, TENNESSEE.

MACHINE FOR MAKING CHOCK-BLOCKS.

1,133,931.

Specification of Letters Patent. Patented Mar. 30, 1915.

Application filed June 4, 1913, Serial No. 771,760. Renewed October 17, 1914. Serial No. 867,247.

*To all whom it may concern:*

Be it known that I, ABEL D. CATLIN, citizen of the United States, residing at Chattanooga, Tennessee, have invented certain new and useful Improvements in Machines for Making Chock-Blocks, of which the following is a specification.

My invention is intended to make blocks for chocking automobiles or other machines in transportation or for other purposes, and in carrying out my invention rectangular blocks of wood are presented to the machine and are formed thereby with a curved face adapted to fit the wheel which is to be chucked.

The invention consists of the features of construction and arrangement and combination of parts hereinafter described and particularly defined by the appended claim.

In the accompanying drawings Figure 1 is a side elevation of a machine embodying my invention; Fig. 2 is a front view; Fig. 3 is a section of the rotary cutter head or drum; Fig. 4 is an elevation of the same.

In these drawings, 1 indicates the base frame having standards 2 extending up therefrom, with journal boxes 3 at their upper ends, said journal boxes affording supports for a shaft 4 having a driving pulley 5 thereon, and having the rotary cutter head or drum 6 arranged between the standards, as shown in Fig. 2. This rotary cutter head or drum is so positioned in relation to the base that its lower periphery runs close to the upper surface of the base, and adjacent a guide 7 fixed by bolts 8 to the upper surface of the base at the front of and in line with the periphery of the cutter drum. The guide has upstanding sides 9 spaced apart at a suitable distance to receive between them the block which is to be shaped by the cutter head into the form of a chock block. The cutter head or drum has a series of knives 10 adjustably mounted thereon in recesses 11 by bolts 12 passing through slots 13 in the knives or cutters. The knives extend at an inclination to the periphery of the drum, and their cutting edges project slightly beyond said periphery. It will be noticed from Fig. 2 that the knives are not of a width to extend from side to side of the drum or of the guide 7, and consequently each knife performs only a partial cutting away of the block in respect to its width. It will be noticed further that the knives are staggered in position relative to each other, one being arranged adjacent the left edge of the drum periphery, the next one at the right hand side of the drum periphery, the next at the left hand side, and so on throughout the series. They are of such a width, however, that their cutting edges extend from the side edge of the periphery of the drum past the center line of the periphery, so that the knives overlap in their action upon the blocks. Adjacent each knife there is an intact portion of the periphery of the drum, that is, this portion is not pocketed or recessed like the portion which receives the knife, but these portions form said periphery, being indicated by the line 14 in Fig. 1, and by the reference character 14 in Fig. 2. As before stated, the cutting edges of the knives project slightly beyond the periphery of the drum, and hence, as shown in Fig. 1, they project slightly beyond the line 14.

In the operation of the apparatus the drum or cutter head is rotated in the arrow direction, Fig. 1, and the operator places a block of the proper dimensions between the flanges or upstanding sides of the guide 9, and moves the block into contact with the cutter head or drum. The knives acting thereon will cut by successive actions the curved face of the block, the said block being moved gradually toward the central vertical plane of the drum as the work proceeds.

Referring to Fig. 2, the first cutting knife of the set there shown will have acted on the left hand portion of the block, the next knife will act on the right hand portion, the next knife on the left hand portion, and so on, the cutting actions overlapping, as above described. In these cutting actions the block will find a bearing against the periphery of the drum at the points 14, first at the right, then at the left, again at the right, and so on, and these intact portions 14 will act as stopping or limiting surfaces to prevent the chock block as it is formed from being drawn or locked in the converging space formed by the periphery of the drum and the guide. The rotary head or drum operates in a casing 15. The chips will pass away from the machine down the runway or incline 16.

I claim as my invention:—

In a machine for making chock blocks, the combination of a rotary drum, a plurality of cutters thereon arranged in two series, one series being at each edge of the drum, those of one series alternating with those of the other series and each cutter extending only part way across the face of the drum, leaving an intact portion of the drum surface at its edge between the cutters of the other series, a support for the blocks to be formed, arranged to face the cutting drum and substantially tangentially to the periphery of the cutter head, said support being open at its top and having upstanding sides or guides to receive between them the block to be shaped, substantially as described.

In testimony whereof, I affix my signature in presence of two witnesses.

ABEL D. CATLIN.

Witnesses:
 WALTER DONALDSON,
 BURNETT S. JONES.

Copies of this patent may be obtained for five cents each, by addressing the "Commissioner of Patents, Washington, D. C."